UNITED STATES PATENT OFFICE.

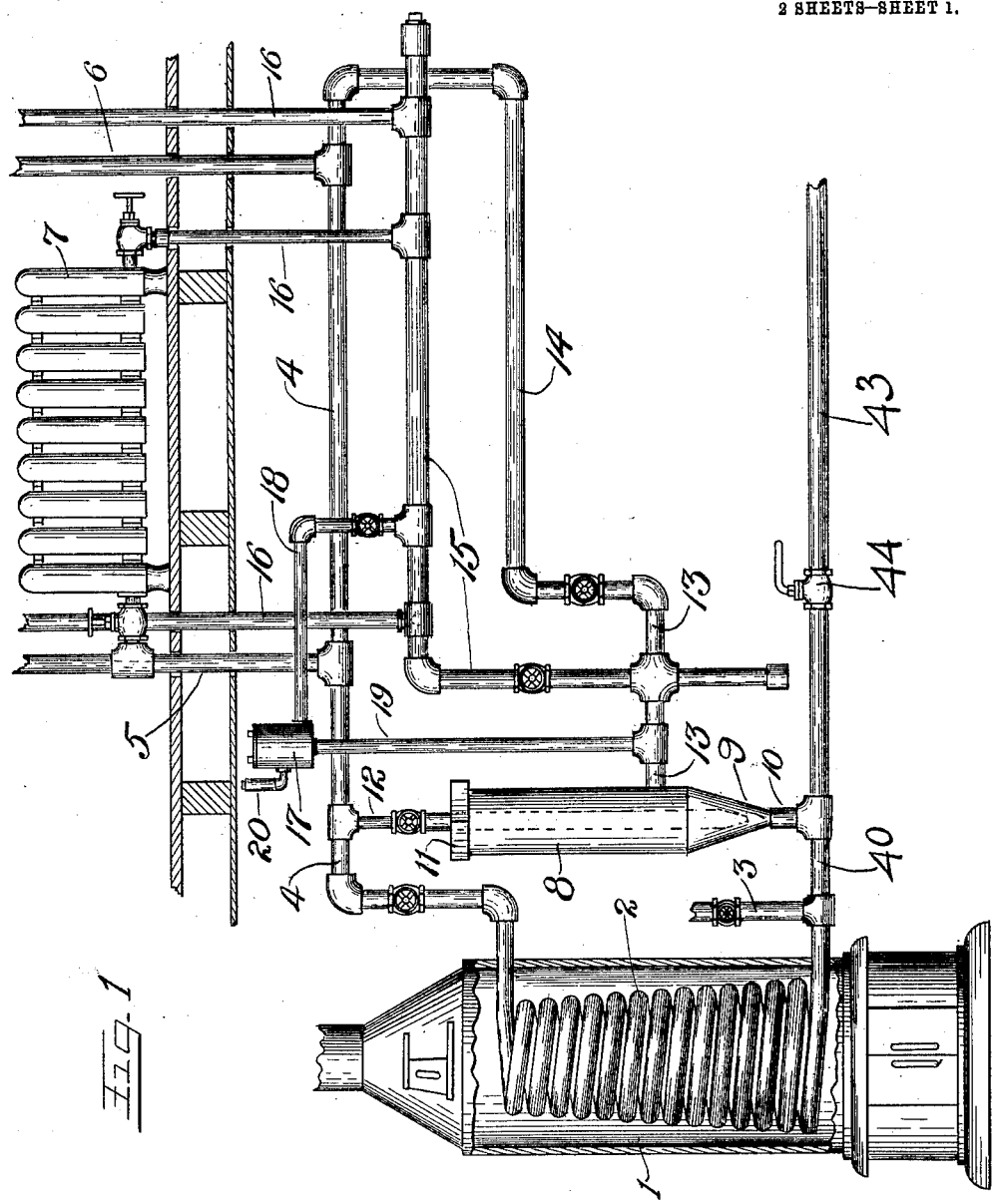

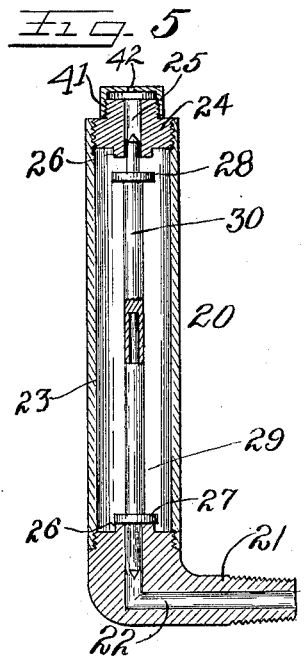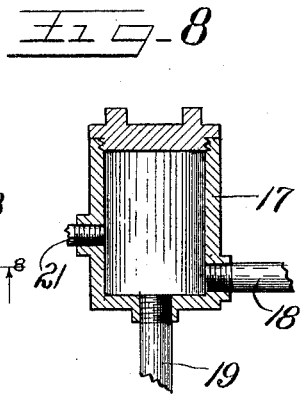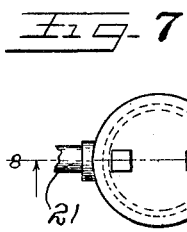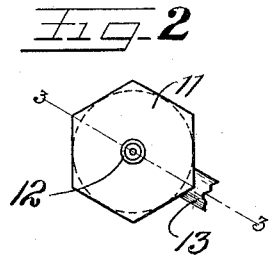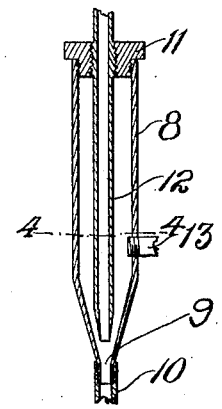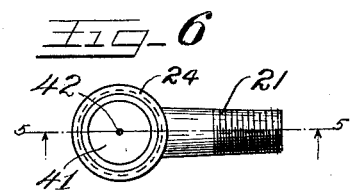

CHARLES A. STJERNQUIST, OF CHICAGO, ILLINOIS.

HEATING SYSTEM.

1,089,598.  Specification of Letters Patent.  Patented Mar. 10, 1914.

Application filed April 1, 1910. Serial No. 552,895.

*To all whom it may concern:*

Be it known that I, CHARLES A. STJERNQUIST, a citizen of the United States, and a resident of the city of Chicago, in the county of Cook and State of Illinois, have invented certain new and useful Improvements in Heating Systems; and I do hereby declare that the following is a full, clear, and exact description of the same, reference being had to the accompanying drawings, and to the numbers of reference marked thereon, which form a part of this specification.

My invention relates to steam heating systems, and has for its main object to provide an improved system wherein a portion of the steam generated is utilized to perform the double function of maintaining a partial vacuum in the return side of the system, whereby the circulation of the steam therethrough will be aided, and of returning the water of condensation to the heater.

My invention also embodies certain minor improved details of construction, as will be hereinafter more definitely pointed out and claimed, reference being had to the accompanying drawings, in which:—

Figure 1 is a somewhat diagrammatic view of a heating system embodying my invention. Fig. 2 is a top plan view of the suction chamber. Fig. 3 is a section on line 3—3 of Fig. 2. Fig. 4 is a section on line 4—4 of Fig. 3. Fig. 5 is a section on line 5—5 of Fig. 6. Fig. 6 is a top plan view of the air valve. Fig. 7 is a top plan view of the air chamber. Fig. 8 is a section taken on line 8—8 of Fig. 7.

As shown in the drawings: 1, indicates a generator which may be of any suitable construction, but which, for convenience, is shown as comprising a heating coil 2. In a coil generator the water feed pipe 3 communicates with the return pipe 40 for the coil and in a generator having a water chamber the pipe 3, will open into any suitable part of the chamber, said pipe communicating with any suitable source of supply, as, for instance, a supply tank or water main.

A discharge or steam pipe 4, communicates with the outlet end of the heating coil or water chamber, communicating with which are the pipes 5—6, which supply steam to the radiators 7.

A suction or siphoning mechanism is connected across the coil 2, or water chamber of the generator with the steam pipe 4, and return pipe 40, for the heater. Said suction device comprises a suction chamber 8, which has a restricted outlet end 9, which is externally threaded. A pipe 10, is threaded on the end of said suction chamber and is connected with the return pipe 40, for the generator. Threaded into the top of the suction chamber is a cap 11, through which is threaded a pipe 12, which extends below the inlet pipe 13, for the suction chamber and is slightly restricted at its discharge end to act as an ejector. The upper end of said pipe 12, is connected in the steam pipe 4. A pipe 14, connects the steam pipe 4, with the inlet pipe 13, for the suction chamber 8, and affords a direct return. A return pipe 15, communicates with the inlet pipe 13, for the suction chamber 8, and riser pipes or return pipes 16, discharge into said return pipe 15, from the radiators.

Supported in any convenient position is an air chamber or tank 17, which communicates with the return pipe 15, by means of a pipe 18, and also communicates with the inlet pipe 13, for the suction chamber 8, by means of a pipe 19.

Secured to the air chamber 17, is an air valve 20, which comprises a stem 21, adapted at one end to be threaded into the casing and which is provided with a passage 22, opening through each end of the stem. A tube or casing 23, is threaded on the opposite end of the stem 21, and a plug 24, is threaded into the upper end of the casing 23, and is provided with a passage 25. A cap 41, is threaded on said plug and is provided with a small aperture 42.

Both the plug and stem are provided with internal valve seats 26, against which are adapted to seat the valve closures 27—28, which are each connected to a stem 29, or 30. The lower stem 29, is constructed of any suitable metal as iron or steel and the stem 30, is constructed of suitable material having a high heat coefficient of expansion.

The construction of the valve is such that when cold air enters the chamber 17, from the system the pressure unseats valve 27, and escapes through the valve casing and valve 28, to the atmosphere but when steam enters the chamber 17 and valve casing, the stem 30, expands forcing valve closures 27 and 28, on their seats to prevent escape of steam. Atmospheric air cannot enter the air chamber 17, as the valve 27, would seat by gravity and air pressure to effectively preclude admission of atmospheric air.

The operation is as follows: On starting the system, the return pipes 15 and 16, are full or partially filled with water, and also steam pipe 4, and direct return pipe 14, may be full or partially filled with water. As steam is generated it rises in steam pipe 4, against the pressure of the water that may be contained therein. The steam first reaches the pipe 12, into which a part of it passes, and from whence it enters the suction chamber 8, at the discharge end creating a suction or producing a siphoning action to draw the water from pipes 14 and 15, and the risers 16, and radiator supply pipes 6. The water is thus quickly siphoned or drawn from said pipes relieving the pressure otherwise impeding the advancement of the steam which permits the steam to rapidly circulate through the pipes 5—6, to the radiators. This water is delivered to the generator by the forcing action of the steam passing through said pipe 12, as is all the water of condensation as it is drawn into chamber 8. Valves are inserted at any suitable places in the system by opening or closing of which the suction may be effected in both the direct return pipe 14 and return pipe 15 from the radiators or in either set of pipes independently of the others. After the heating is well started the valve in the pipe 12, is regulated to admit the desired quantity of steam into the suction chamber to produce the required degree of suction to effect the desired rate of circulation. A pipe 43, is connected with the inlet pipe 40, by means of a valve 44, and leads to the sewer main adapting the system being cleaned out at any time desirable by opening the valve 44.

With this system the pressure of the steam does not have to be raised as high as in other systems as the water is suctioned from the pipes thereby obviating the necessity for the steam being raised to a sufficiently high pressure to force the water from the pipes before the steam can reach the radiators. This permits economy in both steam and fuel and effects a considerable saving. The air returning with the water from the radiators passes through pipes 18 or 19, into air chamber 17, and is admitted from said chamber to the atmosphere. However, neither atmospheric air can enter the system through said chamber nor can steam escape from the system for reasons heretofore set forth with respect to the air valve.

The cycle of operation of the system in all its phases is the same irrespective of whether or not a continuous operation is taking place or the system is being started up for the first time. When the boiler is fired up a certain amount of steam is generated, which passes upwardly through the pipe 4, and, owing to the back pressure in the system, due to the inertia of the water and air in the radiators and in the returns therefrom, the steam first generated passes downwardly through the pipe 12, and through the inspirator 8, whereupon meeting entrained cold water condenses, thus causing an injector action to take place, and producing a suction on the radiator returns which are connected into the inspirator at said pipe 13. Of course, with a slight reduction of pressure in the radiator returns the live steam leaving the boiler rushes upwardly through the risers and into the various radiators, although, of course, the injector action taking place in the inspirator continues, the amount thereof of course, being regulable by a valve shown connected in pipe 12. Of course, air is liable to be entrained in the system, especially when the same has been out of use, and for the purpose of ridding the system of the entrained air an air chamber 17 is provided with an inlet pipe 18 communicating therewith and connected in the radiator return line, so that as the air is drawn into the radiator returns due to the suction of the inspirator it will pass into the air chamber 17, and inasmuch as said chamber 18 is equipped with a conventional type of radiator valve 20, the air which is always a great deal cooler than the vapor circulating in the system, will be permitted to pass out through the valve 20, but should vapor find access to said chamber 17, and tend to flow outwardly through said valve 20, the valve 20, of course being thermostatic, as is usual in such type of valves, will close and prevent escape of the vapor. Any vapor that passes into the air chamber 17, and condenses flows through the pipe 19 into the radiator return 13. It is apparent that due to the double connection on said air chamber 17, by means of said inlet pipe 18 and outlet pipe 19, that the pressure in said air chamber is maintained substantially the same as that of the return line of the system, so that as the water flows through the returns, air entrained therewith, will naturally pass upwardly into said air chamber, which is disposed above the boiler and above the return line to be thereby collected in said chamber, and although said chamber may at times be below atmospheric pressure it is impossible for outside air to enter through the valve 20, owing to the construction thereof, said valve acting as a check valve to prevent air from ever flowing inwardly into the chamber 17. Should sufficient air, however, be entrained in the system, as to tend to cause the same to become air bound, generation of steam within the boiler will of course cause the pressure to rise with a consequent rise of pressure in said air chamber 17, and the same rising above atmospheric will cause the air to flow outwardly to the atmosphere.

Inasmuch as the system is a closed system it has been found that very little air finds access thereto after the same is in operation, and the chief function of the air chamber 17, is to collect and relieve the system of air when first starting up.

I have shown the pipe 14, which is the return of the steam loop, as connected into the cross pipe 13, to which the radiator return pipe 15, is also connected, so that the inspirating effect serving to draw the water through the radiator return will also maintain a certain flow in the steam loop. However, the pipe 14, may be connected at the pipe 10, so as to be practically unaffected by the suction of the inspirator, and I have found that the very slight circulation which then takes place through the steam loop 4 and 14, is thoroughly practical. Of course, a chamber 17, connected into the system and above the water line thereof serves to cushion the system to prevent water hammering and sudden transfers of slugs of water which produce a disagreeable noise.

The construction disclosed is exceedingly simple and highly efficient and it is obvious that the construction may be modified in many ways and the connections arranged in any suitable manner to produce the results desired.

I have shown but one very simple construction and I am fully aware that numerous changes may be made without departing from the principles of this invention. I therefore do not desire to limit myself otherwise than necessitated by the prior art.

I claim as my invention:

1. A steam heating system, comprising a steam generator, a steam pipe leading from said generator to the supply side of the system, a return for the system, an air chamber communicating with said return, a thermostatically controlled valve connected to said air chamber and adapted to permit cold air to escape, to prevent admission of atmospheric air and to cushion the system under excessive internal pressure, a condensation chamber with which the system return communicates, and an ejector in said chamber connected with the supply side of the system for returning the water of condensation to the generator.

2. A steam heating system, comprising a steam generator, a steam pipe leading from said generator to the supply side of the system, a return for the system, an air chamber communicating with said return, a valve chamber connected to said air chamber, valves in said valve chamber closing in opposite directions, the discharge valve being thermostatically controlled and said valves coöperating to close the discharge from said chamber under access of steam to said chamber, a condensation chamber with which the system return communicates, and an ejector in said chamber connected with the supply side of the system for returning the water of condensation to the generator.

3. A steam heating system, comprising a steam generator, a steam pipe leading from said generator directly to the supply side of the system, a single return pipe for the whole system, an air chamber communicating with said return, a valve chamber connected to said air chamber, valves in said valve chamber closing in opposite directions, the discharge valve being thermostatically controlled and said valves coöperating to close the discharge from said chamber under access of steam to said chamber, a condensation chamber with which the system return communicates, a return pipe leading from said condensation chamber to said generator, and an injector pipe tapped into said steam pipe and discharging in said chamber between the point of entrance thereinto of the inlet from the system return pipe and the connection therewith of the generator return pipe.

In testimony whereof I have hereunto subscribed my name in the presence of two subscribing witnesses.

CHARLES A. STJERNQUIST.

Witnesses:
K. E. HANNAH,
A. T. CONCANNON.

---

Copies of this patent may be obtained for five cents each, by addressing the "Commissioner of Patents Washington, D. C."